United States Patent [19]

Hoberman et al.

[11] Patent Number: 4,574,367
[45] Date of Patent: Mar. 4, 1986

[54] MEMORY CELL AND ARRAY

[75] Inventors: Barry A. Hoberman, Palo Alto; William E. Moss, Sunnyvale, both of Calif.

[73] Assignee: Monolithic Memories, Inc., Santa Clara, Calif.

[21] Appl. No.: 551,736

[22] Filed: Nov. 10, 1983

[51] Int. Cl.[4] ............................................. G11C 11/40
[52] U.S. Cl. ..................................... 365/179; 365/155
[58] Field of Search ................. 365/78, 155, 179, 221, 365/233; 307/458

[56] References Cited

U.S. PATENT DOCUMENTS 3,487,376 12/1969 Hart, Jr. ............................... 365/179
4,151,609 4/1979 Moss ..................................... 365/221

FOREIGN PATENT DOCUMENTS 55-64685 5/1980 Japan .................................... 365/155
752490 8/1980 U.S.S.R. ............................... 365/78

Primary Examiner—Joseph A. Popek
Attorney, Agent, or Firm—Steven F. Caserza; Alan H. MacPherson; Terrence E. Dooher

[57] ABSTRACT

A fall-through memory array comprising in a plurality of rows and columns a plurality of memory cells, each memory cell comprising a pair of cross-coupled transistors having three emitters, a collector and a base. Control potentials applied to a word line, coupled to each one of two of the emitters of each of the transistors, control the transfer of data bits from one row of such memory cells to another.

8 Claims, 2 Drawing Figures

MEMORY CELL AND ARRAY

BACKGROUND OF THE INVENTION

1. Field of the Invention

The present invention relates to fall-through memory arrays in general and, in particular, to a novel first-in, first-out type buffer memory array.

2. Description of the Prior Art

Memory arrays are formed by a plurality of memory cells which are typically arranged in a plurality of rows and columns. The cells in a particular row store a plurality of bits which form a single word. Among the various types of memory arrays employed in digital equipment, e.g. computers, communications networks, and the like, there is often found a type of memory array called a fall-through memory stack, or simply a stack. For obvious reasons, such arrays are called stacks because, in operation, a plurality of words, either data words or addresses, are sequentially stored in a first word location in the array and then propagated toward the opposite end of the array until the array is filled.

In general, there are two types of such arrays; a first-in, last-out array and a first-in, first-out array.

As its name implies, a first-in, last-out array is so called because out of a series or succession of words transferred to and stored in the array, the first word stored therein is the last word to be retrieved therefrom. In contrast, a first-in, first-out array (FIFO) is so called because out of a series or succession of words transferred to and stored in the array, the first-word stored therein is the first word retrieved therefrom.

The latter type of array, namely the first-in, first-out type of array, to which the present invention is directed in particular, has, heretofore, been implemented in a number of ways.

In describing the operation of such arrays it is convenient to characterize the operation of each cell in the array by defining its operation in terms of a holding mode and a transferring mode. The holding mode is defined as that mode of operation of a particular memory cell during which time it is holding data in a more or less static sense. On the other hand, the transferring mode is defined as that mode of operation during which the contents, i.e., a logical 1 or a logical 0, of a particular memory cell is being transferred to an adjacent memory cell in the same column of memory cells in the memory array. Typically, the contents of all memory cells in a row in a memory array are transferred concurrently to an adjacent row in the array during the transferring mode, thereby transferring an entire word from one row to an adjacent row.

In typical prior art first-in, first-out type memory arrays, each memory cell in a row of memory cells was coupled to a single word line. Control potentials on the word line determined whether the memory cell was operating in a holding mode or in a transferring mode.

In operation, in the transferring mode of prior art arrays, a low going pulse was used to transfer the contents of one memory cell to another in the same column of the array; however, in practice, it was difficult to insure reliable operation over a wide range of temperature and power supply voltages. If, for example, due to temperature and power supply fluctuations, the pulse did not go low enough, no transfer would occur. If the pulse went too low, the contents of adjacent memory cells would uncontrollably transfer beyond the row in which it is desired to receive data. A transistor circuit of the type referred to which uses low going pulses to effect a word transfer in a first-in, first-out type memory array is shown at node 90 in FIG. 2D and described in column 3, line 30, et seq. of U.S. Pat. No. 4,151,609, issued on Apr. 24, 1979 to William E. Moss and assigned to the assignee of the present application, and which is hereby incorporated by reference.

SUMMARY

In view of the foregoing, a principal object of the present invention is a novel memory array of the type in which words are automatically propagated through the array from one row of memory cells to another.

Another object of the present invention is a novel memory array of the type belonging to the class of memory arrays known as first-in, first-out and first-in, last-out type memory arrays.

A principal feature of an array constructed according to the teachings of the present invention is that each memory cell in the array includes a pair of cross-coupled multiple emitter transistors. More specifically, each cross-coupled transistor includes a first, a second, and a third emitter, a collector and a base. The first emitters of each of the transistors in a row of the array are connected in common to a first word line. The second emitters of each of the transistors in a row of the array are connected in common to a second word line. The collector of each multiple emitter transistor is connected to a corresponding third emitter of a corresponding transistor in a memory cell in a first adjacent row of memory cells. The third emitter is connected to the collector of a corresponding transistor in a memory cell in a second adjacent row of memory cells; said first and said second adjacent rows being designated, with respect to the direction of propagation of words therethrough, as downstream and upstream rows, respectively.

In operation, instead of having a holding mode in which the word line(s) are held high and a transferring mode in which the word line(s) are momentarily driven low, the word lines of the present invention are moved from a low to a high potential to effect a word transfer. This has the advantage of eliminating the dependency heretofore required on relatively stable power supply potentials and temperatures.

There are additional advantages in using two word lines in conjunction with a pair of cross-coupled three-emitter transistors in each memory cell according to the present invention. These advantages spring from the fact that a necessary gate in the single control word line in related prior known first-in, first-out memory arrays may be omitted. By omitting the gate heretofore required, there is not only a desirable reduction in the number of active devices in the circuit, but there is also the elimination of undesirable propagation delays associated therewith.

BRIEF DESCRIPTION OF THE DRAWING

The above and other objects, features and advantages of the present invention will become apparent from the following detailed description of the accompanying drawing in which.

DETAILED DESCRIPTION

Figure 1:
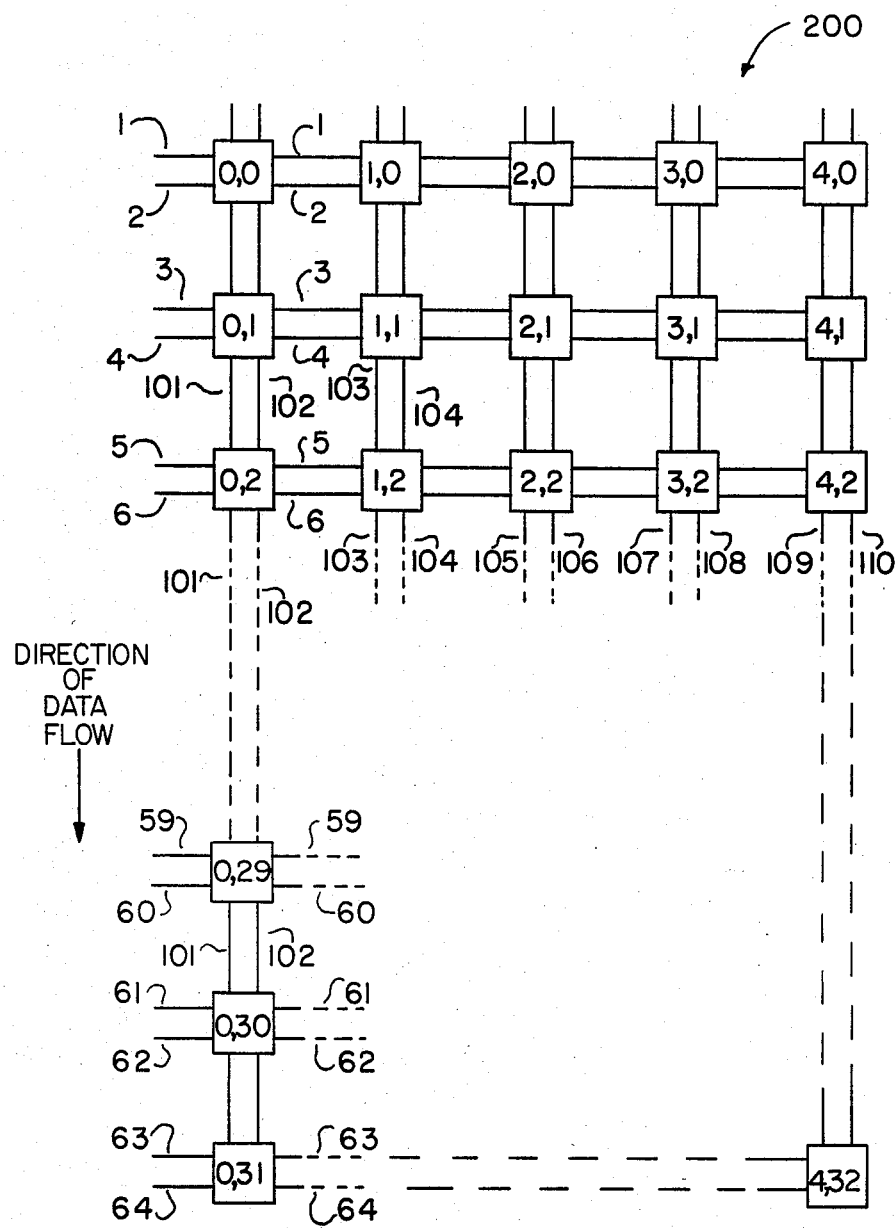
FIG. 1 is a memory array according to the present invention.

Referring to FIG. 1 there is provided in accordance with the present invention, a memory array 200 including a plurality of memory cells 0,0 through 4,32. The memory cells 0,0 through 4,32 are arranged in 32 rows with five memory cells in each row. Of course, the number of rows and columns of memory cells can be changed to accommodate particular applications.

Coupling the memory cells in each row, there is provided a pair of word lines. For example, coupling the memory cells to each other in the first row there is provided a pair of word lines 1,2. Coupling the memory cells to each other in the second row there is provided a pair of word lines 3,4 and so on, for a total of 32 pairs of word lines.

For coupling adjacent pairs of memory cells in each column, there is provided another pair of lines. For example, coupling the memory cells in the first or leftmost column there is provided a plurality of lines 101 and 102. Coupling the memory cells in the second column from the left there is provided a plurality of lines 103 and 104 and so on for a total of five pairs of lines for coupling each adjacent pair of memory cells in a column.

Figure 2:
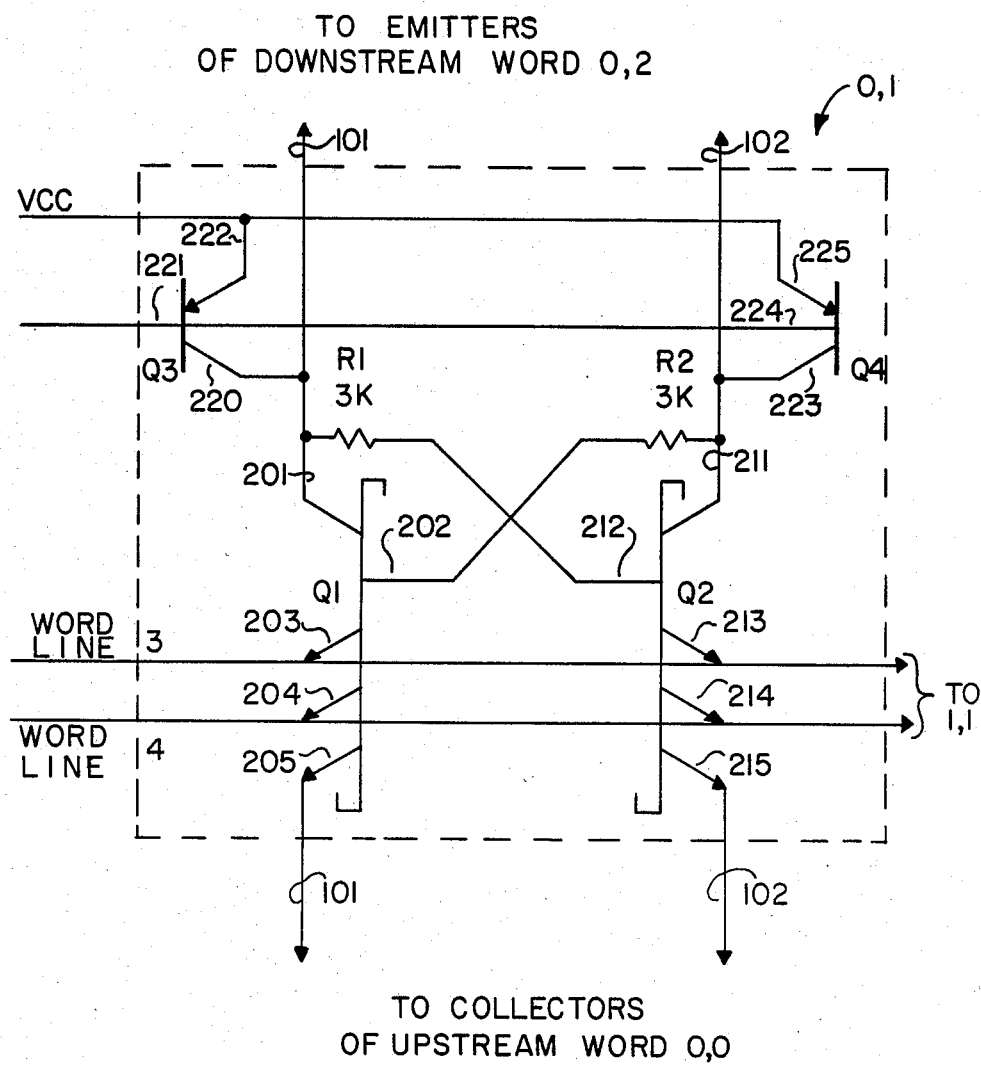
FIG. 2 is a memory cell of the array of FIG. 1.

Referring to FIG. 2, there is shown a schematic diagram of the memory cell 0,1. All other memory cells in array 200, other than those in the first row (i.e., cells 0,0; 1,0; 2,0; 3,0; 4,0), are identical to the memory cell 0,1 and therefore, only cell 0,1 will be described in detail. In the first row, the transfer of a word to the cells can, if desired, be controlled by a single word line although two word lines are shown in FIG. 2.

In memory cell 0,1 there is provided a pair of cross coupled multiple emitter Schottky transistors Q1 and Q2. Of importance, Schottky transistors need not be used, but the use of Schottky transistors provides greater speed.

In transistor Q1 there is provided a collector 201, a base 202 and three emitters 203, 204 and 205. In transistor Q2 there is provided a collector 211, a base 212 and three emitters 213, 214 and 215. Coupling the collector 201 of transistor Q1 to the base 212 of transistor Q2 there is provided a 3K ohm resistor R1. Coupling the collector 211 of transistor Q2 and the base 202 of transistor Q1 there is provided a 3K ohm resistor R2. The use of resistors R1 and R2 provides a greater voltage differential between the collectors 201 and 211 of transistors Q1 and Q2, respectively, thereby providing a greater tolerance, which in turn increases the yield of the devices.

Coupled to the collectors 201, 211 of each of the transistors Q1 and Q2 there is provided a lateral PNP transistor Q3 and Q4, respectively, each forming a current source. The transistor Q3 includes a collector 220, a base 221 and an emitter 222. The transistor Q4 includes a collector 223, a base 224 and an emitter 225. The collector 220 of transistor Q3 is coupled to the collector 201 of the transistor Q1. The collector 223 of the transistor Q4 is coupled to the collector 211 of the transistor Q2. The bases 221 and 224 of the transistors Q3 and Q4 are connected in common to a source of reference voltage VREF. The emitters 222 and 225 of the transistors Q3 and Q4 are connected in common to a source of potential, VCC.

As described above with respect to the array of FIG. 1, the collectors 201 and 211 of the transistors Q1 and Q2 are coupled to the corresponding third emitters 205 and 215 of the corresponding transistors Q1 and Q2 in the adjacent downstream word 0,2 (not shown) by the lines 101 and 102 respectively.

The third emitters 205 and 215 of the memory cell 0,1 are coupled to the collectors 201 and 211 of the corresponding upstream memory cell 0,0 (not shown) by a pair of lines 101 and 102 respectively.

All of the emitters 203 and 213 of the transistors Q1 and Q2 of each of the memory cells in a particular row of the array 200 are connected in common to the word line 3. Similarly, the second emitters 204 and 214 in each of the memory cells in the row are connected in common to the word line 4.

In operation, one of the two transistors Q1 and Q2 in each of the memory cells is conducting, thereby storing either a logical one (transistor Q1 on and transistor Q2 off) or a logical zero (transistor Q1 off and transistor Q2 on). Depending on which of the two transistors Q1 and Q2 in the upstream memory cell 0,0 is conducting, a change in potential from a low to a high potential on both of the word lines 3 and 4 will cause the transistors Q1 and Q2 in cell 0,1 to either retain their present state of conduction or to switch between a conducting and a nonconducting state with the result that the downstream cell will contain the same data as the upstream cell. Thus, in general, the potential on the collectors of the transistors Q1 and Q2 in an upstream memory cell and the state of conduction of the transistors in the downstream memory cell to which they are connected, determines whether the transistors in the downstream memory cell switch between conducting and nonconducting states upon the application of predetermined word line control voltages to the latter transistors' first and second emitters. The data transfer operation is terminated when one or both of the word lines is brought low.

To better understand the operation described above, reference may be made to the following table of six sets of binary data stored in cells 0,0 and 1,0, and exemplary potentials applied to the electrodes of the transistors Q1 and Q2 of a downstream memory cell 0,1. Q1 and Q2 are assumed to be silicon bipolar Schottky transistors. All potentials are positive and are typical of the potentials used in the operation of silicon bipolar Schottky transistors.

|   | Cell 0,0 | 1,0 | 201 | 202 | 203 | 204 | 205 | 211 | 212 | 213 | 214 | 215 |
|---|---|---|---|---|---|---|---|---|---|---|---|---|
| 1 | 0 | 0 | .6 | 1.1 | .3 | 1.5 | .6 | 1.2 | .6 | .3 | 1.5 | 1.2 |
| 2 | 0 | 0 | .9 | 1.4 | .6 | 1.5 | .6 | 1.5 | .9 | .6 | 1.5 | 1.2 |
| 3 | 0 | 0 | .9 | 1.4 | 1.1 | 1.5 | .6 | 1.5 | .9 | 1.1 | 1.5 | 1.2 |
| 4 | 1 | 0 | .6 | 1.1 | .3 | 1.5 | 1.2 | 1.2 | .6 | .3 | 1.5 | .6 |
| 5 | 1 | 0 | .9 | 1.4 | .6 | 1.5 | 1.2 | 1.5 | .9 | .6 | 1.5 | .6 |
| 6 | 1 | 1 | 1.5 | .9 | 1.1 | 1.5 | 1.2 | .9 | 1.4 | 1.1 | 1.5 | .6 |

In examples 1, 2 and 3, it is assumed that the potentials on the third emitters 205 and 215 of cell 0,1, which are the collector potentials of the upstream transistors Q1 and Q2 of cell 0,0, are 0.6 and 1.2 volts, respectively, (i e., upstream cell 0,0 stores a logical zero). The control potential on the word line 4 coupled to the second emitters 204 and 214 is assumed to be 1.5 volts or greater.

In example 1, with the above assumed potentials on the designated electrodes of transistors Q1 and Q2 of cell 0,1 and with Q1 of cell 0,1 conducting and Q2 of cell 0,1 nonconducting (i.e., cell 0,1 stores a logical zero), the control potential of 0.3 volts on the word line 3 coupled to the first emitters 203 and 213 of transistors Q1 and Q2 of cell 0,1 does not result in any change in the state of Q1 and Q2. As is seen from the table, this is because the base-to-emitter voltages of all emitters except emitter 203 is less than 0.8 volts. Thus, only the first emitter 203 of Q1 is conducting.

In example 2, when the control potential on the first emitters 203, 213 is raised from 0.3 to 0.6 volts, the potentials on the collectors and bases of Q1 and Q2 changes as shown in the table. These changes cause the first emitter 203 of Q1 to continue to conduct and the third emitter 205 of Q1 to start conducting.

In example 3, when the control potential on the first emitter 203 of Q1 is raised further to 1.1 volts, the corresponding changes in of the collector and base potentials of Q1 and Q2, a shown in the table, cause the first emitter 203 of Q1 to stop conducting and the third emitter 205 of Q1 to start conducting. This is due to the fact that, in accordance with well known princples of operation of silicon bipolar transistors, the base and collector potentials of Q1 cannot rise more than 0.8 and 0.3 volts, respectively, above the lowest potential on all of the emitters of Q1. It will be noted that under these conditions all of the emitters of transistor Q2 remain nonconducting.

Since it can be seen that further increases in the potential on the first emitters 203, 213 of Q1 and Q2 will not change the state of conduction of transistors Q1 and Q2, no further examples need to be given for the case in which the upstream data stored in cell 0,0 to be transferred to cell 0,1 is identical with the data already stored in cell 0,1.

In light of the above discussion, it will be appreciated that the lack of a change in the state of conduction of transistors Q1 and Q2 means that whatever logical value is stored by the upstream memory cell 0,0, is identical with the logical value stored by the memory cell 0,1. That is, if the upstream cell contained a logical "0" (or a logical "1") so does the memory cell 0,1 also stores a logical "0" (or a logical "1").

In examples 4, 5 and 6, the potentials assumed to exist on the third emitters 205, 215 of transistors Q1 and Q2 are reversed from those assumed in examples 1, 2 and 3. That is, the upstream cell 0,0 is assumed to contain a logical "1" and the cell 0,1 to be described contains a logical "0" with 1.2 and 0.6 volts on its third emitters 205 and 215 respectively.

Referring to example 4, with Q1 conducting, Q2 not conducting and 1.5 volts on the word line 4 coupled to the second emitters 204 and 214 of Q1 and Q2, an increase in the potential on the word line 3 coupled to the first emitters 203 and 213 of Q1 and Q2 from 0 to 0.3 volts does not change the state of conduction of transistors Q1 and Q2.

Similarly, as shown in example 5, a further increase in potential applied to the first emitters 203 and 213 to 0.6 volts does not change the state of the conduction of transistor Q1 and Q2. However, a still further increase in this potential will.

Referring to example 6, a further increase in the potential on the first emitters 203 and 213 from 0.6 to 1.1 volts results in switching the first emitter 203 and hence transistor Q1, from a conducting state to a nonconducting state. At the same time, the third emitter 215 of transistor Q2 and, hence, the transistor Q2 is switched from a nonconducting to a conducting state. Thus, the logical one stored in upstream cell 0,0 is copied into cell 0,1.

The reason why the transistors Q1 and Q2 switch states is because, as the potential on the collector of Q1 and, hence, on the base Q2 rises to a level whereat there is a 0.8 volt base-to-third emitter voltage for the third emitter 215 of Q2, the third emitter 215 begins conducting. As the third emitter 215 of Q2 begins conducting, the collector 211 potential thereof drops to 0.9 volts, i.e., 0.3 volts above the third emitter 215 potential of 0.6 volts. As the potential on the collector 211 of Q2 drops to 0.9 volts, the potential on the base 202 of Q1 follows 0.1 volts below to a potential of 0.8 volts, thus turning off the first emitter 203 of the transistor Q1.

After the switching of transistors Q1 and Q2 occurs and the transferring (i.e. copying) to cell 0,1 of the data stored by the upstream memory cell 0,0 is completed, potentials on the word lines 3, 4 coupled to the first and second emitters of transistors Q1 and Q2 are driven by other circuitry (not shown) to 0.3 volts to thus establish a holding mode potential on the collectors of Q1 and Q2 of 1.2 and 0.6 volts, respectively.

The operation of the cell in response to a logical one stored in both cell 0,1 and the upstream cell 0,0 is similar to examples 1 through 3. Also, the operation of the cell in response to a logical zero stored in upstream cell 0,0 and transferred to cell 0,1 which had previously stored a logical one is similar to examples 4 through 6. It is therefore provided by this invention a unique memory cell which allows for much easier design and fabrication of FIFO memory devces, having greater reliability and increased yield as compared with prior art FIFO memories.

While the invention is described above with respect to a preferred embodiment thereof, it is contemplated that various modifications can be made thereto without departing from the input and spirit and scope of the present invention. Consequently, it is intended that the scope of the invention not be limited to the embodiment described, but rather, be determined solely by the claims hereinafter provided.

I claim:

1. A memory array comprising a plurality of rows and columns of memory cells wherein each of said memory cells comprises:
   a first and a second transistor, each of said transistors comprising a first, a second and a third emitter, a base and a collector;
   a first and a second word line coupled to said first and said second emitters respectively, of each of said first and said second transistors in a row of said memory cells;
   means for coupling each of said third emitters to the collector of a corresponding one of said first and said second transistors in an adjacent memory cell in a column of said memory cells;
   means for coupling each of said collectors to one of said third emitters of a corresponding one of said first and said second transistors in an adjacent memory cell in said column of said memory cells; and
   means for coupling the base of each of said first and said second transistors to the collector of the other one of said transistors.

2. A memory array according to claim 1 wherein said base coupling means comprises a means for providing a resistance.

3. A memory array according to claim 1 comprising a current source coupled to the collector of each of said first and said second transistors.

4. A memory array according to claim 3 wherein each of said current sources comprises a lateral PNP type transistor.

5. A memory array comprising a plurality of rows and columns of memory cells wherein each of said memory cells comprises:
   a first and a second transistor in a first row, each of said transistors comprising a plurality of electrodes including a first, a second and a third emitter, a base and a collector;
   means for coupling each of said first and said second transistors to a pair of corresponding transistors in an adjacent row of said memory cells in said array; and
   means for applying predetermined potentials to said electrodes for transferring a bit of information between said first and said second transistors and said corresponding transistors in said adjacent row.

6. An array according to claim 5 wherein said first row comprises an upstream row and said adjacent row comprises a downstream row and said potential applying means comprises means for applying control signals to said first and said second emitters and said coupling means comprises means for coupling each of said third emitters to a collector of one of said corresponding transistors in said upstream row and means for coupling the collector of each of said first and said second transistors to a corresponding third emitter of one of said corresponding transistors in said downstream row.

7. An array according to claim 6 comprising means for coupling said first and said second emitters of said first and said second transistors to corresponding first and second emitters of a plurality of corresponding transistors in a row of memory cells in said array.

8. An array according to claim 6 comprising means responsive to said control signals applied to said first and said second emitters and the potential on each of said third emitters for controlling which one of said first and said second transistors will be conducting.

* * * * *